US007603488B1

(12) United States Patent
Gravenstein et al.

(10) Patent No.: US 7,603,488 B1
(45) Date of Patent: Oct. 13, 2009

(54) SYSTEMS AND METHODS FOR EFFICIENT MEMORY MANAGEMENT

(75) Inventors: Martin Gravenstein, Nevada City, CA (US); Nirmalendu B. Patra, Grass Valley, CA (US); Andrew Probst, Penn Valley, CA (US); Dave Ohmann, Grass Valley, CA (US); Clair A. Hardesty, Georgetown, TX (US)

(73) Assignee: Alereon, Inc., Austin, TX (US)

( * ) Notice: Subject to any disclaimer, the term of this patent is extended or adjusted under 35 U.S.C. 154(b) by 467 days.

(21) Appl. No.: 10/892,538

(22) Filed: Jul. 15, 2004

Related U.S. Application Data

(60) Provisional application No. 60/487,293, filed on Jul. 15, 2003, provisional application No. 60/487,302, filed on Jul. 15, 2003, provisional application No. 60/487,563, filed on Jul. 15, 2003, provisional application No. 60/487,348, filed on Jul. 15, 2003, provisional application No. 60/487,341, filed on Jul. 15, 2003, provisional application No. 60/487,349, filed on Jul. 15, 2003.

(51) Int. Cl.
*G06F 13/28* (2006.01)
*G06F 3/00* (2006.01)

(52) U.S. Cl. .............................. 710/22; 710/20; 710/21; 710/56; 711/120; 712/9

(58) Field of Classification Search ........................ None
See application file for complete search history.

(56) References Cited

U.S. PATENT DOCUMENTS

| | | | | | |
|---|---|---|---|---|---|
| 5,930,827 | A | * | 7/1999 | Sturges | 711/170 |
| 6,026,464 | A | * | 2/2000 | Cohen | 711/5 |
| 6,154,793 | A | * | 11/2000 | MacKenna et al. | 710/23 |
| 6,654,819 | B1 | * | 11/2003 | Comisky et al. | 710/22 |
| 6,820,142 | B2 | * | 11/2004 | Hofstee et al. | 710/25 |
| 2002/0097594 | A1 | * | 7/2002 | Bruce et al. | 365/49 |
| 2003/0012223 | A1 | * | 1/2003 | Chappell et al. | 370/468 |
| 2003/0123392 | A1 | * | 7/2003 | Ruutu et al. | 370/235 |

* cited by examiner

*Primary Examiner*—Eron J Sorrell
*Assistant Examiner*—Dean Phan
(74) *Attorney, Agent, or Firm*—Sprinkle IP Law Group

(57) ABSTRACT

Systems and methods for providing efficient memory allocation, reduced processor intervention and power consumption, and increased memory access bandwidth. One embodiment comprises a system including a plurality of memory units which are accessible in parallel, a dynamic memory unit configured to dynamically allocate and deallocate storage space in the memory units, and a plurality of direct memory access (DMA) engines configured to access the memory units in parallel through the memory management subsystem. The system may be implemented in the MAC engine of a device that communicates with other devices via a wireless communication link. This embodiment may store packets in FIFOs within the memory units as elements of linked list data structures that can be joined together without having to move the previously stored data. DMA engines access a context table to obtain DMA channel information that enables them to move data through appropriate DMA channels.

31 Claims, 6 Drawing Sheets

SYSTEMS AND METHODS FOR EFFICIENT MEMORY MANAGEMENT

RELATED APPLICATIONS

This application claims priority to U.S. Provisional Patent Application No. 60/487,293, entitled "Wireless Mesh Networking Implemented over TDMA" by Gravenstein, filed Jul. 15, 2003; U.S. Provisional Patent Application No. 60/487,302, entitled "Wireless 1394 by Means of Wireless DMA" by Hardesty, et al., filed Jul. 15, 2003; U.S. Provisional Patent Application No. 60/487,348, entitled "Parallel Access Instruction Driven—Dynamic Memory Unit," by Probst, et al., filed Jul. 15, 2003; U.S. Provisional Patent Application No. 60/487,563, entitled "Efficient Data Transfer Mechanism," by Patra, et al., filed Jul. 15, 2003; and U.S. Provisional Patent Application No. 60/487,341, entitled "Packet Reordering for Hi-speed Networks," by Patra, et al., filed Jul. 15, 2003; U.S. Provisional Patent Application No. 60/487,349, entitled "Building a Wireless PCI Bridge by Means of Wireless DMA," Hardesty, et al., filed Jul. 15, 2003; each of which is fully incorporated by reference as if set forth herein in its entirety.

BACKGROUND

1. Field of the Invention

The invention relates generally to data storage and more particularly to systems and methods for storing data with improved space-efficiency, power-efficiency and bandwidth in medium access controllers.

2. Related Art

Wireless computer systems and other wireless electronic devices are playing increasingly important roles in consumers' lives. More and more people have mobile phones, PDAs, laptop computers and various computer peripherals and other devices. With the proliferation of these devices, there is a desire to improve the performance of the devices, in terms of space efficiency (size,) power efficiency, interconnectivity, ease of use, and so on.

The development of smaller and more portable computing devices has placed more emphasis on the importance of efficient memory management. There is an increasing need for mechanisms that make the most efficient use of available memory. There is also a need to make the memory accessible with higher bandwidth and to reduce the power consumption associated with memory management.

Conventional mechanisms for memory management (e.g., memory management units, or MMUs) are constrained by various limitations. For example, in conventional systems, memory is statically allocated prior to its use. In other words, a judgment is made as to the amount of memory that will be required for a particular program or process, and this amount of memory is allocated for use by the program/process. If insufficient memory is allocated, the program/process may not have enough memory to store all of the data that it needs to store, and some of the data may be lost. This may be referred to as a data overflow. In order to avoid a data overflow condition, it may be desirable to over-allocate (i.e., to allocate more memory than is expected to be used.) If less than all of the memory is actually used, however, the unused portion of the memory is wasted—it is not used by the program/process, yet could not be allocated to a different program/process. Whether the memory space is under-allocated or over-allocated, the usage of the memory space is inefficient.

Another limitation of conventional systems is that it is difficult and/or expensive to provide increased bandwidth for accessing the memory. The amount of data that can be written into or read from the memory is therefore limited, at least by practical (e.g., cost) considerations. It is also typically also the case in conventional systems that memory accesses and allocation are expensive in terms of the amount of processor intervention than is required. The cost of this processor intervention corresponds to not only loss of processing cycles that are used for memory management, but also power that is consumed by the processor in performing memory management functions.

Still another limitation of conventional systems is that the mechanism used by the host system for accessing data in the memory is generally incompatible with the most efficient mechanism for the radio controller to access the data. An embedded processor is usually required to restructure the data in memory as it is passed between the host and radio.

SUMMARY OF THE INVENTION

One or more of the problems outlined above may be solved by the various embodiments of the invention. Broadly speaking, the invention comprises systems and methods for providing improved access to memory, wherein memory space is efficiently allocated, processor intervention and corresponding power consumption are reduced, and memory access bandwidth is increased. In one embodiment, a memory management subsystem (the dynamic memory unit) includes multiple ports through which a memory can be accessed in parallel. The dynamic memory unit also includes a direct memory access (DMA) engine for moving data from the access ports to storage locations in the memory. The dynamic memory unit further includes a mechanism for dynamically allocating and deallocating space in the memory on an as-needed basis.

One embodiment comprises a system including a plurality of memory units which are accessible in parallel, a dynamic memory unit configured to dynamically allocate and deallocate storage space in the memory units, and a plurality of direct memory access (DMA) engines configured to access the memory units in parallel through the memory management subsystem.

In one embodiment, the system is implemented in the MAC engine of a device that communicates with other devices via a wireless communication link. In this embodiment, the dynamic memory unit stores packets and packet fragments in FIFOs within the memory units as elements of linked list data structures. The linked lists can be joined together (e.g., to incorporate newly-received intermediate elements) to form larger linked lists without having to move the previously stored data. A context table which defines a plurality of DMA channels and corresponding FIFOs in the memory units is stored in a memory (possibly in the same memory units) where it is accessible by the DMA engines. The DMA engines access the context table to obtain information to enable them to move data through appropriate DMA channels.

An alternative embodiment comprises a method including providing multiple memory units that are accessible in parallel, dynamically allocating and deallocating storage space in the memory units as space is needed to store data, and accessing the memory units in parallel through a memory management subsystem using a plurality of direct memory access (DMA) engines. Alternative embodiments of the method may include features as described above in connection with the system embodiments.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
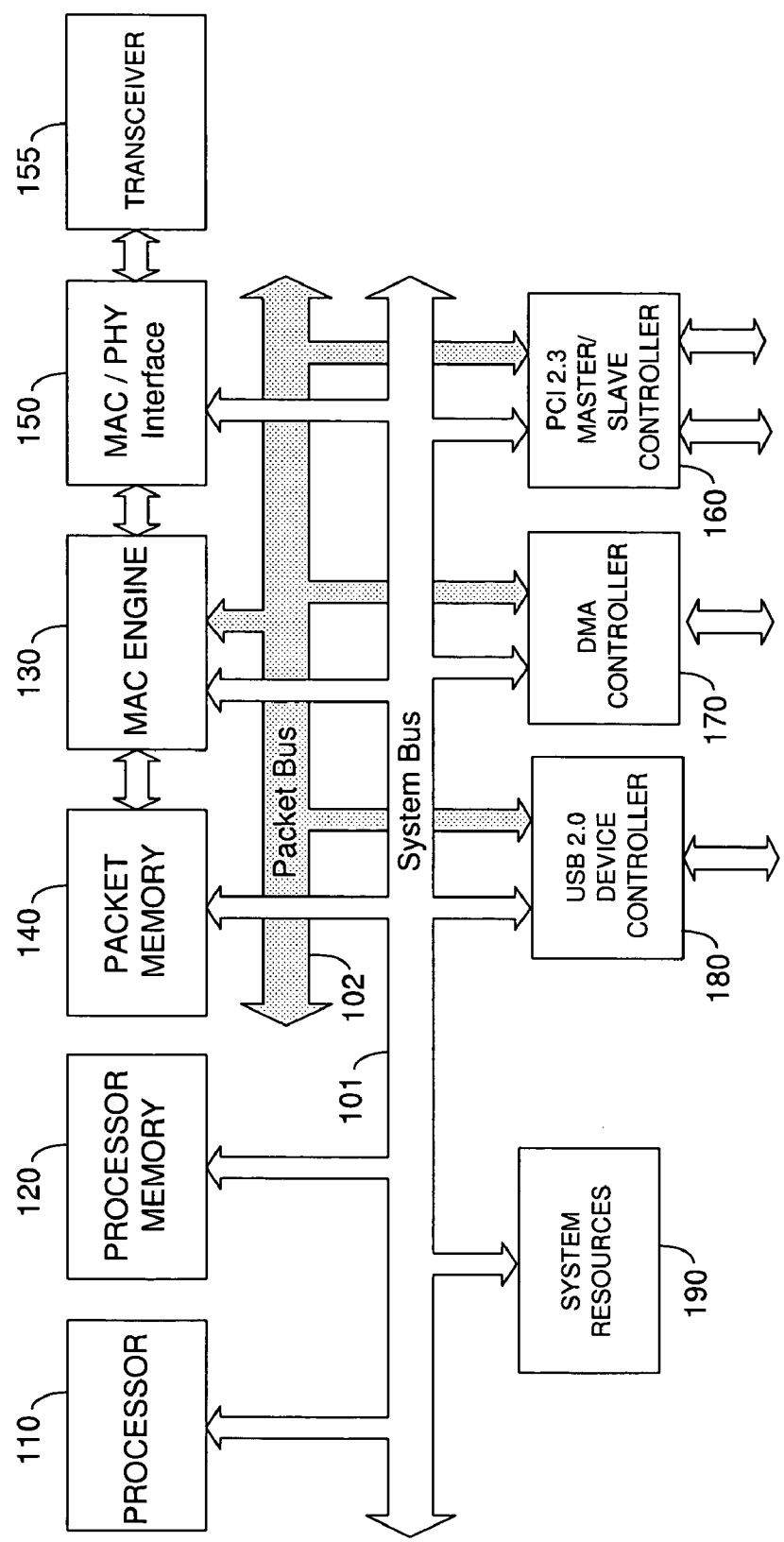
FIG. 1 is a functional block diagram illustrating the structure of a computing device in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

Overview

As pointed out above, because computing devices (e.g., laptop computers and the devices with which they communicate) are driven to be smaller and more portable, it is necessary to develop improved mechanisms for these devices that are also smaller and more efficient. One area in which improvement can be achieved is memory management. For example, memory systems need to be more efficient in terms of memory usage, access bandwidth, and power efficiency. These needs are addressed by the present systems and methods.

As described herein, various embodiments of the invention comprise systems and methods for providing improved access to memory, wherein memory space is efficiently allocated, processor intervention and corresponding power consumption are reduced, and memory access bandwidth is increased. In one embodiment, a memory management subsystem (the dynamic memory unit) includes multiple ports through which a memory can be accessed in parallel. The dynamic memory unit also includes a direct memory access (DMA) engine for moving data from the access ports to storage locations in the memory. The dynamic memory unit further includes a mechanism for dynamically allocating and deallocating space in the memory on an as-needed basis.

One embodiment of the invention is implemented in the medium access control (MAC) layer of a device having a transceiver for a wireless communication link. The MAC engine of the device includes a dynamic memory unit microengine that provides an interface to the memory used for packet storage. The dynamic memory unit microengine enables a time division multiple access (TDMA) microengine and a first-in-first-out (FIFO) data storage microengine, as well as a microprocessor, to access the packet storage memory in parallel. This increases the bandwidth of the memory. The dynamic memory unit also dynamically allocates and deallocates space in the packet storage memory on an as-needed basis. This provides more efficient use of the memory than is typically possible by conventionally allocating space to a process when the process is initiated. The dynamic memory unit also stores and retrieves data in the packet storage memory using a DMA mechanism. This eliminates the processor intervention through which the memory is conventionally allocated, thereby reducing not only the load on the processor, but also the power used by the processor.

System Architecture

Referring to FIG. 1, a functional block diagram illustrating the structure of a computing device in accordance with one embodiment is shown. In this embodiment, system 100 includes a processor 110, processor memory 120, MAC engine 130, packet memory 140, MAC-PHY (physical) layer interface 150, wireless transceiver 155, PCI controller 160, DMA controller 170, USB controller 180 and system resources 190. (System resources 190 is intended to be representative of the various system resources required by a typical processor based microcontroller that are not specifically depicted in the figure.)

System 100 is designed to process network management commands that may be transmitted to and received from other devices via a wireless communication link and to monitor and maintain the health of the data transceiver system. Transceiver 155 forms one end of this communication link. Transceiver 155 is coupled to the system through MAC engine 130 and MAC-PHY layer interface 150. MAC engine 130 is configured to take data within system 100 (e.g., network commands generated by processor 110 or data received through USB, DMA or PCI controllers 160, 170 or 180,) and prepare this data for transmission by transceiver 155 over the wireless link. MAC engine 130 is also configured to take data received by transceiver 155 via the wireless link and prepare this data for use by other components of system 100.

In this embodiment, MAC engine 130 is coupled to the other components of system 100 through a system bus 101. MAC engine 130 is also coupled to a subset of the system components through a second bus, 102. Bus 102 is a packet bus that couples MAC engine 130 to PCI controller 160, DMA controller 170 and USB controller 180. MAC engine 130 is directly coupled to packet memory 140 and MAC-PHY layer interface 150.

MAC engine 130 includes a dynamic memory unit in accordance with the present disclosure. The dynamic memory unit controls the manner in which packet memory 140 is accessed by the components of MAC engine 130. The dynamic memory and also controls accesses by processor 110 to packet memory 140. The structure of MAC engine 130, including the dynamic memory unit, is illustrated in FIG. 2.

MAC Engine Architecture

Figure 2:
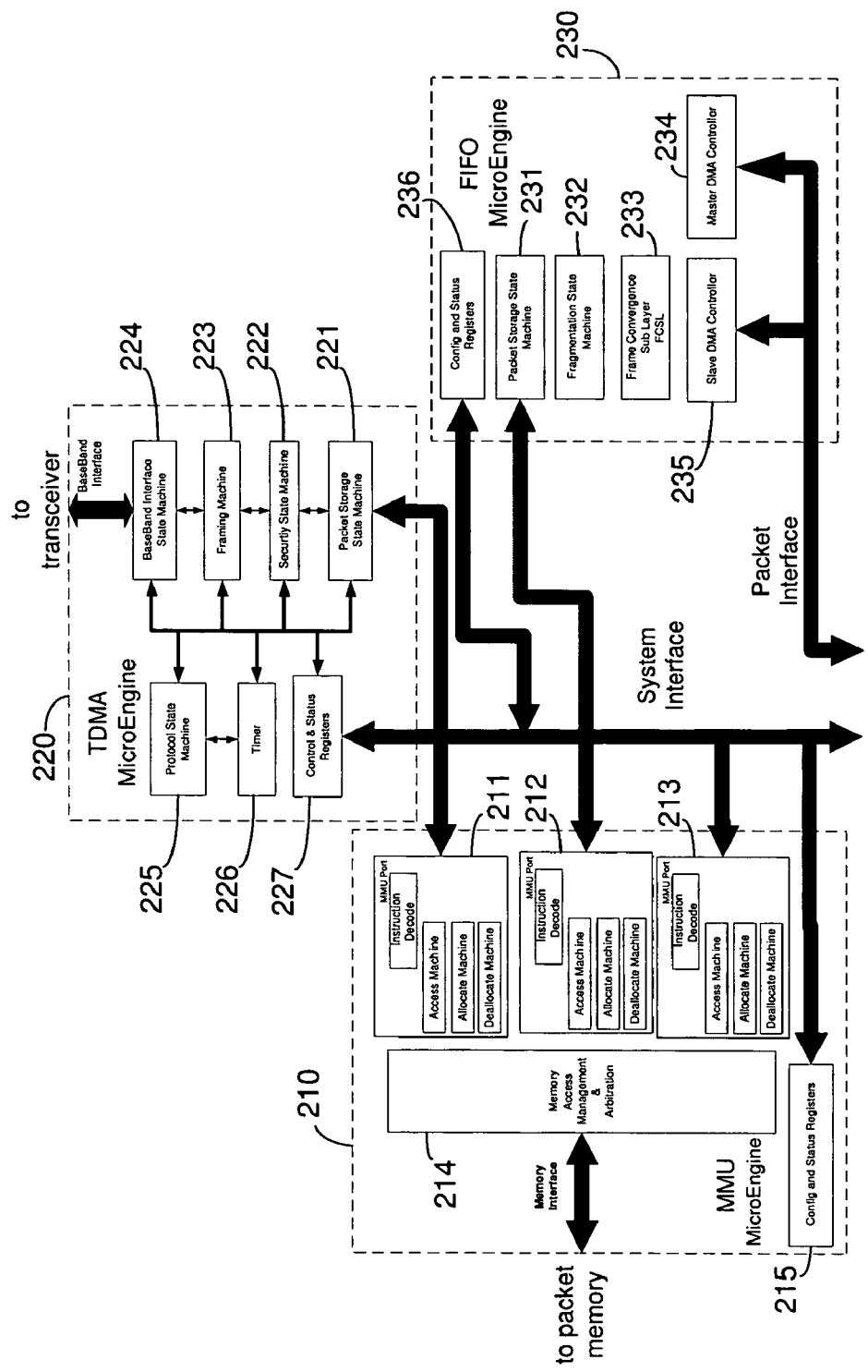
FIG. 2 is a functional block diagram illustrating the structure of a MAC engine in accordance with one embodiment.

Referring to FIG. 2, a functional block diagram illustrating the structure of MAC engine 130 in accordance with the present embodiment is shown. The three main components of MAC engine 130 are the memory management micro engine 210, a TDMA micro engine 220, and a FIFO micro engine 230. Each of the memory management micro engine 210, the TDMA micro engine 220, and the FIFO micro engine 230 are coupled to system bus 101. FIFO micro engine 230 is also coupled to packet bus 102. Each of TDMA micro engine 220 and FIFO micro engine 230 is coupled to a corresponding port of memory management micro engine 210 in order to enable these components to access packet memory 140 (via dynamic memory unit 210.) Processor 110 is also coupled to a port of memory management micro engine 210 to enable access by the processor to packet memory 140.

MMU micro engine 210 includes three ports, 211-213, through which packet memory 140 can be accessed. Access to the packet memory through MMU micro engine 210 is instruction-driven, so each port includes an instruction decoder, as well as state machines which generate corresponding allocate, deallocate and are read/write requests. MMU micro engine 210 also includes a memory access management and arbitration unit 214 that receives the allocate, deallocate and read/write requests and enables corresponding accesses to the packet memory. As will be described in more detail below, the packet memory is implemented using multiple memory units in order to provide parallel accesses to a memory, so the memory access management and arbitration unit also distributes memory allocation among the memory units and arbitrates requests to access the different memory units. MMU micro engine 210 also includes configuration and status registers 215 that are accessible via system bus 101.

TDMA micro engine 220 includes packet storage state machine 221, security state machine 222, framing state machine 223, baseband interface state machine 224, protocol state machine 225, timer 226 and control and status registers 227. Packet storage state machine 221 serves as a DMA engine for TDMA micro engine 220. Packet storage state machine 221 is therefore coupled to a corresponding port, 211, of MMU micro engine 210. Packet storage state machine 221 is responsible for moving data received via the wireless communication link into packet memory 140, and for moving data which is stored in DMA relaxation FIFOS in packet memory 140 to MAC/PHY interface 150.

FIFO micro engine 230 includes its own packet storage state machine, 231, as well as a fragmentation state machine 232, the frame convergence sublayer 233, master and slave DMA controllers 234 and 235, and configuration and status registers 236. Similar to TDMA micro engine 220, packet storage state machine 231 of FIFO micro engine 230 is responsible for moving data in and out of packet memory 140. Data that the system wants to send over the wireless communication link is received by the FIFO micro engine over the packet bus and is moved by packet storage state machine 231 into DMA relaxation FIFOs in packet memory 140 (from which the data is moved by TDMA micro engine 220 to MAC/PHY interface 150.)

The purpose of MAC engine 130 is to allow system 100 to transmit and receive data over the wireless link (via transceiver 155.) It is therefore necessary for MAC engine 130 to perform a number of related functions. For instance, MAC engine 130 has to be able to perform any framing or other formatting that is necessary for transmission of data over the wireless link. MAC engine 130 must also follow the rules of protocol for accessing the shared wireless medium to avoid collisions and to coordinate transmissions, acknowledgements and, if necessary, retry transmissions with peer devices. When MAC engine 130 is receiving data, it must validate the integrity of the packets against error checking mechanisms, if necessary, transmit acknowledgements and eliminate the portions of the data packets used only for these purposes before storage in packet memory.

Operation of Dynamic Memory Unit

While the requirements of the memory management system are very typical, the present dynamic memory unit does not meet these requirements in a conventional manner. The dynamic memory unit differs from conventional solutions in three respects. First, memory allocation for data stored in the packet memory is performed dynamically. Rather than pre-allocating an estimated amount of required space for a particular DMA channel, the dynamic memory unit allocates space in packet memory for each DMA channel as the space is needed, and then deallocates the space when it is no longer needed. Second, data movement between the host and the packet memory, and between the packet memory and the wireless link, is performed using a DMA mechanism and without the data movement usually required by packet restructuring. Because no processor intervention is necessary to restructure or move the data, processing cycles and power that would conventionally be consumed in moving this data are no longer required. Third, the dynamic memory unit allows parallel access to the packet memory. Thus, rather than having to wait for one component (e.g., the TDMA micro engine) to finish accessing the packet memory before another component (e.g., the FIFO micro engine) can access the memory, both can access the memory at the same time.

It should also be noted that the dynamic memory unit differs form conventional solutions in terms of the compatibility of the host and radio controller mechanisms for accessing data in the memory. While conventional systems typically have to use an embedded processor to restructure the data in memory in order to effectively pass the data between the host and the radio controller, the dynamic memory unit uses a memory structure (linked list storage of packets and/or packet fragments) that is both compatible with both the host storage mechanism and efficient for use with the radio controller.

Dynamic Allocation of Memory

Data is stored in packet memory 140 as part of a DMA channel. In other words, if data is being moved from one device or component to another via a DMA operation, part of the operation is the storage of the data in a FIFO, or DMA relaxation buffer. The storage of the data in this manner allows for differences in the rate at which the data becomes available at the originating device and the rate at which the data can be accepted by the receiving device. In conventional systems, memory space is allocated for the DMA relaxation buffers before any data is stored in these buffers. The amount of space allocated for this purpose is based upon expectations of usage rather than actual usage. If the amount of data that needs to be stored is greater than expected, there may be an overflow resulting in loss of data. If the actual requirements are less than expected, some of the space goes unused. When multiple data links are being managed, the over allocation of memory for one link must be balanced with the increased possibility of overflow for other links.

Instead of pre-allocating memory space, the dynamic memory unit of MAC engine 130 allocates and deallocates blocks of packet memory 140 as it is needed. As TDMA micro engine 220 or FIFO engine 230 move data to MMU micro engine 210, MMU micro engine 210 allocates space for the data to be stored in the memory. Thus, if memory space is not actually needed to store data (i.e., actual usage is less than estimated usage,) the space is not allocated. On the other hand, if a particular FIFO must store more data than expected, MMU micro engine 210 can continue to allocate space to this FIFO, as long as additional space is available in packet memory 140. Thus, in contrast to prior art systems, no judgment needs to be made as to the amount space to be allocated for these buffers, and system performance does not suffer as a result of poor judgments in this regard (i.e., under-allocation or over-allocation.)

Just as space in packet memory 140 is dynamically allocated by the dynamic memory unit of MAC engine 130, unused space can be dynamically deallocated. As noted above, the space in packet memory 140 is used for DMA relaxation buffers. These buffers are first-in-first-out (FIFO) buffers. Data is stored in one of these buffers by one of the MAC engine components (e.g., TDMA micro engine 220) and retrieved from the buffers by another of the MAC engine components (e.g., FIFO micro engine 230.) Space in packet memory 140 is allocated for each block of data as it is stored in the corresponding buffer, and, when the data is retrieved from the buffer, the space is deallocated.

The dynamic allocation and deallocation of space within packet memory 140 is enabled in the dynamic memory unit by the particular data storage scheme that is employed. The scheme used by the dynamic memory unit is based on the use of linked list data structures. A linked list data structure consists of a series of links. Each link comprises a piece of data (e.g., an entry in the FIFO) and a pointer to the next link. The last link may have a null pointer, indicating that there are no subsequent links.

A conventional FIFO buffer typically consists of a contiguous block of memory that is pre-allocated for the buffer. When a piece of data is stored in a conventional FIFO buffer, the data is written to a storage location indicated by a write pointer, and then the write pointer is advanced to the next contiguous block, where the next piece of data will be written. When a piece of data is retrieved from this type of FIFO buffer, the data is read from a storage location indicated by a read pointer, and then the read pointer is advanced to the next contiguous block, from which the next piece of data will be read. (At some point, the storage space will wrap around from one blocked to another which is not contiguous.) It may not be possible to allocate additional memory for the buffer because there may not be any contiguous, unallocated space.

In contrast to conventional FIFO buffers, the dynamic memory unit can implement a FIFO buffer in non-contiguous memory locations through the use of the linked list data structures. When it is necessary to allocate space for an entry in the buffer, the space can be anywhere in the memory. The newly allocated space can be associated with the desired buffer by simply setting the pointer of the preceding entry in the linked list to indicate the newly allocated space. Because the memory allocated to the buffer (the linked list) need not be contiguous, additional memory can be allocated to the buffer as needed. Similarly, when entries are removed from the buffer, the corresponding memory can be deallocated, so that it can be subsequently used by any of the other buffers.

DMA

In the dynamic memory unit of MAC engine 130, data movement is accomplished using a DMA mechanism. In this mechanism, the packet storage state machines of TDMA micro engine 220 and FIFO micro engine 230 act as DMA controllers. When system 100 has data that is ready to be transmitted over the wireless link, a request is transmitted to FIFO packet storage state machine 231. When this request is received, packet storage state machine 231 reads the data to be sent and writes this data to a FIFO in packet memory 140 via MMU micro engine 210. When TDMA micro engine 220 detects that there is data in this FIFO that is ready to be transmitted, TDMA packet storage state machine 221 reads the data from the FIFO and writes the data to MAC/PHY interface 150. The data is then forwarded to transceiver 155 and transmitted over the wireless link. The data path from the originator of the data to the packet memory and then to the wireless link comprises a DMA channel.

When transceiver 155 receives data over the wireless link, a request is sent to TDMA packet storage state machine 221. When this request is received, TDMA packet storage state machine 221 reads the data and then writes the data to a corresponding FIFO in packet memory 140 (which is accessed through MMU micro engine 210.) When a certain amount of data is detected in this FIFO by FIFO packet storage state machine 231, the data is read out of the FIFO and written to a memory location corresponding to the recipient of the data. The data path from the wireless link to the packet memory and on to the recipient comprises another DMA channel.

The use of the DMA mechanism within MAC engine 130 dominates the need for processor intervention in the movement of data from wireless transceiver 155 into the system, and in the movement of data from the system to the wireless transceiver. The processor therefore has more processing cycles that can be used for other tasks, such as the execution of network management, link optimization or user applications. Elimination of processor intervention from the data movement also reduces the amount of power consumed in moving the data and thereby makes the system more power-efficient. It should be noted that, in the embodiment of MAC engine 130, the DMA mechanism of the dynamic memory unit (which is used to move data to and from transceiver 155) is separate from the DMA mechanism that is used in the remainder of the system. The dynamic memory unit employs packet storage state machines 221 and 231 to move data within MAC engine 130. Data movement between MAC engine 130 and other components of the system is performed by separate DMA mechanisms (e.g., master and slave DMA controllers to 34 and 235, PCI master/slave controller 160, DMA controller 170, etc.)

Parallel Access

The dynamic memory unit of MAC engine 130 increases the bandwidth with which packet memory 140 can be accessed by enabling parallel accesses to the memory. As noted above, MMU micro engine 210 includes three ports, 211, 212 and 213. Each of these ports is separately accessible. Port 211 is coupled to packet storage state machine 221 of TDMA micro engine 220. Port 212 is coupled to packet storage state machine 231 of FIFO micro engine 230. Port 213 is coupled to system bus 101 to enable access by processor 110. Processor 110, TDMA micro engine 220 and FIFO micro engine 230 can all access the respective ports of MMU micro engine 210 in parallel.

Each of the separate ports of MMU micro engine 210 is coupled to memory access management and arbitration unit 214. Memory access management and arbitration unit 214 receives access requests from ports 211-213 and manages the corresponding accesses to packet memory 140. Packet memory 140 is actually implemented as multiple memory units, each having a portion of the total packet storage memory space. While only one access can be made to a particular memory unit at a given time, each of the individual memory units can be accessed at the same time, effectively providing parallel access to the memory.

Memory access management and arbitration unit 214 allocates space randomly among the individual memory units that make up packet storage memory 140. Thus, consecutive accesses by a single micro engine, or consecutive entries within a particular FIFO, may be to memory locations that are not contiguous and may not even be in the same memory unit. The reason for this random allocation of memory is to reduce possible collisions and contention for access to the memory. If the allocation were deterministic (e.g., if entries in a particular FIFO were all stored in the same memory unit,) the deterministic accesses to the memory would likely cause contention of (e.g., one micro engine might be trying to write to the memory unit while another micro engine might be trying to read from the same memory unit.) By randomly allocating space in the packet memory, the possibility of contention for a single memory unit can be evaluated statistically. In this situation, as the number of memory units that are employed in the packet memory increases, the chances of contention for any given memory unit decreases. In the embodiment of MAC engine 130, the use of twelve individual, separately accessible memory units for packet storage memory 140 provides acceptable performance.

Instruction-Driven Access

As noted above, each of ports 211-213 of MMU micro engine 210 includes an instruction decoder, as well as allocate, deallocate and access (read/write) state machines. This is because, in the embodiment of FIG. 2, accesses to packet memory 140 are instruction-driven. This design allows packet memory-related functions to be completed more quickly. For example, memory is conventionally allocated in two steps. First, there is a write to a control register indicating that it is desired to allocate a block of memory. Then, it is necessary to perform a read to get the pointer to the allocated memory. In the present, instruction-driven design, the same thing can be accomplished in one step—an "allocate" instruction is issued, where this instruction returns a pointer to the allocated memory. The design of the embodiment shown in FIG. 2 also includes an instruction bus to support this instruction-driven access to the packet memory.

When, for example, TDMA micro engine 220 wants to access packet memory 140, an instruction is transmitted via the instruction bus to the corresponding port of MMU micro engine 210. The instruction is decoded to determine whether it is an allocate, deallocate or read/write instruction. Memory is then allocated, deallocated or accessed in accordance with the instruction. In one embodiment, an allocate state machine pre-allocates several memory blocks and simply assigns one of these blocks to a particular FIFO when a corresponding allocate instruction is received. A pointer to the memory block is then returned to TDMA micro engine 220. When one of the pre-allocated memory blocks is assigned to a FIFO, a replacement block is allocated, so that several will always be ready to be immediately assigned to a FIFO when an allocate instruction is received. Deallocaction of memory blocks in this embodiment occurs after a corresponding deallocate instruction is received. Read and write instructions are immediately acted on by memory access management and arbitration unit 214.

Operation of DMU

Figure 3:
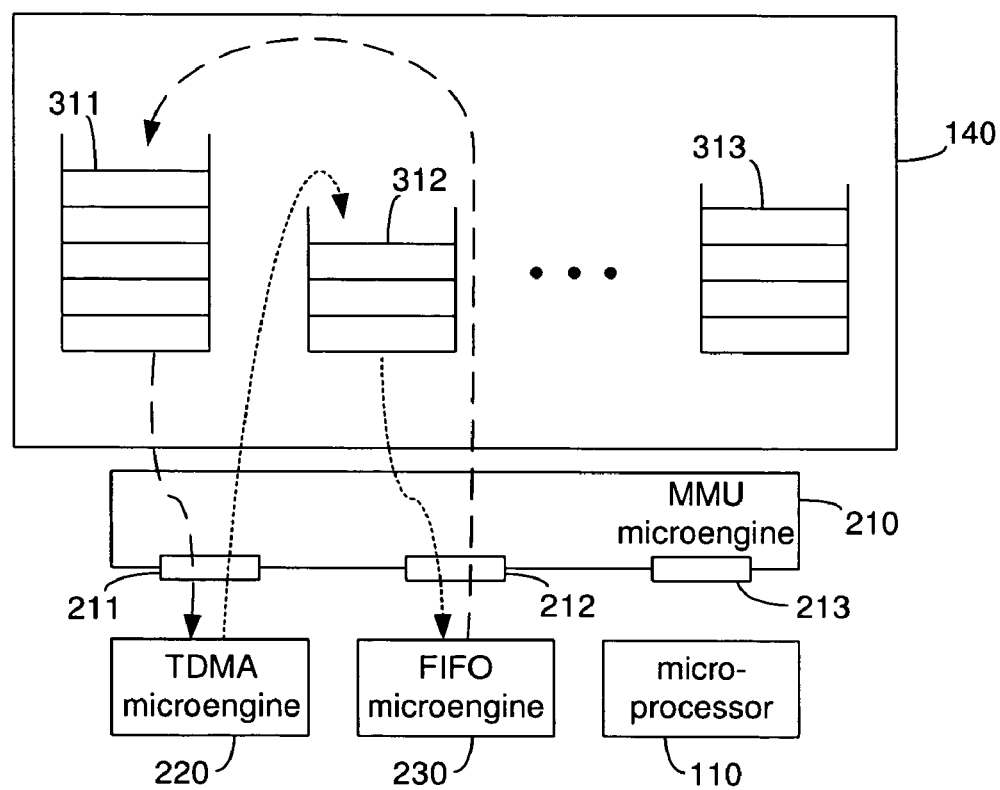
FIG. 3 is a diagram illustrating the operation of a dynamic memory unit in accordance with one embodiment.

The operation of the dynamic memory unit is illustrated in FIG. 3. In this figure, TDMA micro engine 220 and FIFO micro engine 230 are shown accessing packet memory 140 through MMU micro engine 210. TDMA micro engine 220 accesses the memory through port 211, while FIFO micro engine 230 accesses the memory through port 212. Although processor 110 can also access packet memory 140 through corresponding port 213 of MMU micro engine 210, a corresponding access is not explicitly shown in the figure for purposes of clarity.

As depicted in FIG. 3, packet memory 140 stores a set of DMA relaxation FIFOs 311-313. These FIFOs are not physical structures, but are instead data structures that are stored within the memory. While only three of these FIFOs are shown in the figure, it should be noted that there may be more or less FIFOs, depending upon the number of DMA channels that are needed. The only limitation on the number of FIFOs is the total amount of space available in packet memory 140. It should also be noted that, as described above, each of the FIFOs typically consists of blocks of memory that are randomly distributed throughout the different memory units of packet memory 140. The depiction of the FIFOs in this figure is not intended to imply that the FIFOs consist of contiguous blocks of memory.

As explained above, the DMA relaxation FIFOs serve as a sort of "resting place" for data that is being moved through MAC engine 130 from the system to the wireless link, or vice versa. The FIG. 3 illustrates an example of data movement in each direction—from the system to the wireless link, and from the wireless link to the system. Data movement in each direction is considered a separate DMA channel, and each of these DMA channels has its own relaxation buffer within packet memory 140. While only two DMA channels are illustrated in the figure, there may actually be many more, each having its own FIFO.

Transmit Channel

In the case of data that is being moved from the system to the wireless link (i.e., a transmit channel,) the data is first made available to FIFO micro engine 230. FIFO micro engine 230 reads the data from the originating device and then writes the data to packet memory 140. More specifically, the data is written into FIFO 311. Initially, there is no data in FIFO 311, and this FIFO may not even exist. If data had not previously been moved from the originating device within the system to the wireless link, it may be necessary to create FIFO 311. After FIFO 311 has been created, FIFO micro engine 230 can write data into the FIFO. This is illustrated by the dashed line from FIFO micro engine 230 to FIFO 311. As long as FIFO micro engine 230 still has data to be moved, it keeps writing this data into FIFO 311.

TDMA micro engine 220 periodically checks FIFO 311 to see if there is any data in the FIFO that needs to be moved to MAC/PHY interface 150 for transmission over the wireless link. If there is data in the FIFO, TDMA micro engine 220 reads this data from the FIFO and writes it to MAC/PHY interface 150. This is shown by the dashed line from FIFO 311 to TDMA micro engine 220. TDMA micro engine 220 continues to read data from FIFO 311 until an interval allocated to the corresponding DMA channel expires. If there is no more data in the FIFO, TDMA micro engine 220 may wait for additional data to be written into the FIFO, or it may move on to the next FIFO that holds data to be transmitted over the wireless link.

Receive Channel

In the case of data that is being received over the wireless link, a separate DMA channel (a receive channel) is defined. This DMA channel utilizes DMA relaxation FIFO 312. When data is received by MAC/PHY interface 150, TDMA micro engine 220 is notified that the data is available and needs to be moved. TDMA micro engine 220 reads this data and writes the data into FIFO 312. This is shown by the dotted line from TDMA micro engine 220 to FIFO 312. TDMA micro engine 220 continues to read and write data in this manner as long as data is being received over the wireless link.

When the amount of data in FIFO 312 reaches a certain threshold level, a request is sent to FIFO micro engine 230 to move this data. FIFO micro engine 230 then reads the data from FIFO 312 and writes the data to the destination device within the system. Depending upon the configuration of that particular embodiment, FIFO micro engine 230 may continue to move data from FIFO 312 as long as there is data in the FIFO, until the amount of data drops below a certain threshold level, or until a request, interrupt or other event causes FIFO micro engine 230 to switch to a different DMA channel.

Operation of TDMA and FIFO DMA Engines

As explained above, the operation of TDMA micro engine 220 and FIFO micro engine 230 are slightly different with respect to the manner in which they move data. As the name ("time division multiple access") implies, TDMA micro engine 220 divides its available time between the various transmit channels that require its attention. Thus, if there are multiple FIFOs that hold data to be transmitted over the wireless link, TDMA micro engine 220 may, for example, divide a certain period of time by the number of transmit channels (which can be determined from the context table described below.) The resulting interval is the portion of the period that is allocated to each channel. Alternatively, the interval may be specified by the MAC protocol.

Timer 226 controls the timing according to which TDMA micro engine 220 switches from one channel to another. Whenever timer 226 expires, TDMA micro engine 220 stops working on the current task (i.e., stops moving data for a current DMA channel) and switches to the next channel. In one embodiment, when timer 226 expires, TDMA micro engine 220 first checks a task entry table that contains pointers to information on the context, schedule, duration and mode of the next task to be performed. TDMA micro engine 220 then access the indicated memory locations to obtain the information necessary to perform the next task. For instance, TDMA micro engine 220 accesses context information which is stored in a context table and which identifies all of the DMA channels that are being maintained within MAC engine 130. TDMA micro engine 220 then begins moving data from the FIFO buffer corresponding to this channel to MAC/PHY interface 150.

The context table may be allocated in packet memory 140, or it may be allocated in a different memory. The context table is accessible to FIFO micro engine 230, as well as TDMA micro engine 220. As noted above, the context table stores information on all of the DMA channels within MAC engine 130. FIFO micro engine 230 can therefore consult the information in the context table to determine the origination and destination locations for particular DMA channels so that it can, for each channel, read data from and write data to appropriate locations.

As mentioned above, the operation of FIFO micro engine 230 is slightly different from that of TDMA micro engine 220. Instead of being controlled by a timer and spending predetermined intervals moving data corresponding to certain channels, FIFO micro engine 230 operates under a process in which data becomes available, a request to move the data is received, and movement of the data is acknowledged. Thus, FIFO micro engine 230 is responsive to DMA requests. When data is ready to be transmitted by FIFO micro engine 230, a request is transmitted to the micro engine. In response to the request, FIFO micro engine 230 examines the task entry table to get pointers to the appropriate information stored, e.g., in the context table to determine the location from which to read the data, the location to which the data should be written, and the manner in which these actions should be performed. FIFO Micro engine 230 then moves the data according to this information. When the request has been serviced, FIFO micro engine transmits an acknowledgment to the requestor. In one embodiment, a separate channel is used to receive requests and transmit acknowledgments. FIFO micro engine 230 may switch to a new DMA channel when a new request is received, possibly subject to completing movement of data according to a request that is currently being serviced.

As noted above, the present dynamic memory unit provides a number of advantages over conventional memory management units. For example, the dynamic allocation of space in the memory eliminates most underflow/overflow problems that arise from pre-allocation of space, and also maximizes the usage of the limited space in the memory. Further, the use of a DMA mechanism minimizes processor intervention and thereby reduces power consumption associated with memory management. Still further, the use of multiple ports (corresponding to the TDMA and FIFO micro engines and the processor) and multiple, randomly accessed memory units enables parallel access with minimal collisions/contention, thereby increasing the bandwidth of the memory.

Linked Lists

The dynamic memory unit is also beneficial in that it provides support for features such as delayed acknowledgment of the data that is received over the wireless communication link. Further, the dynamic memory unit continues to provide support for delayed acknowledgement in the presence of a packet fragmentation feature. The support for delayed acknowledgment, including in the presence of fragmentation, is based in part on the use of linked list data structures within the packet memory, so these data structures, as well as the delayed acknowledgment feature, will be described in more detail below.

Figure 4:
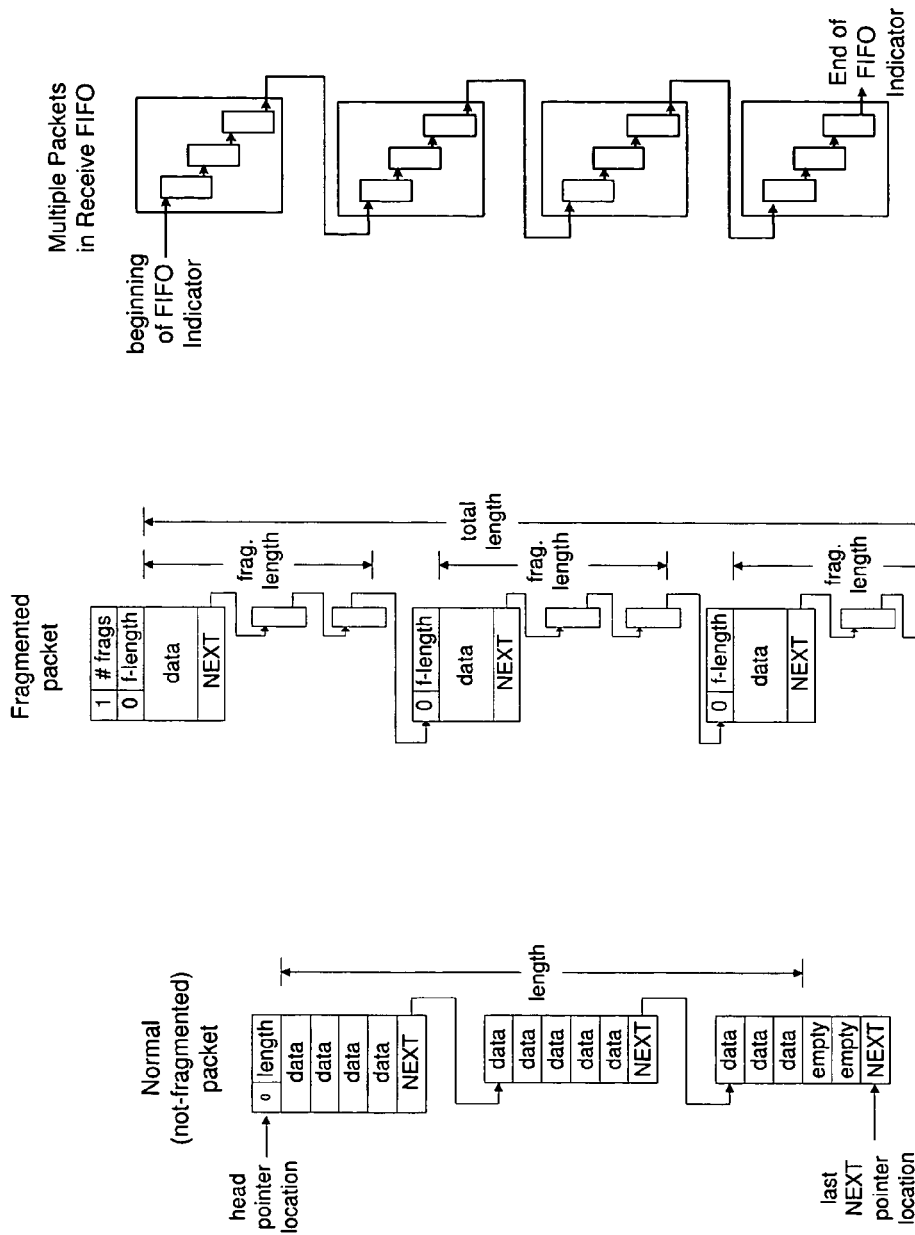
FIGS. 4A-4C are a set of diagrams illustrating the structure of data packets that are stored as linked list data structures in accordance with one embodiment.

Referring to FIGS. 4A-4C, a set of diagrams illustrating the structure of data packets that are stored as linked lists in accordance with one embodiment are shown. FIG. 4A shows the structure of a normal, un-fragmented packet in a linked list structure. FIG. 4B shows the structure of a fragmented packet in a linked list structure. FIG. 4C shows the structure of a FIFO comprising multiple fragmented packets stored as linked lists.

Referring to FIG. 4A, the structure of a single packet stored as a linked list 410 is shown. Linked list 410 includes three linked blocks of memory, 411-413. In this embodiment, each of blocks 411-413 comprises 64 bytes, including 60 data bytes and a four-byte pointer. 64 byte blocks are used in this embodiment. In other embodiments, other block sizes can be used.

In one embodiment, the first byte of the first block (411) of linked list 410, includes a "0" bit 420 and a length 421. The "0" bit indicates that the blocks form a normal, un-fragmented packet. Length 421 indicates the number of data bytes in the packet. This length may span several linked blocks of memory (in this case, three.) The last byte (422) of memory block 411 is a pointer to the block of memory storing the next byte of the packet. As many memory blocks as are needed to store the packet may be allocated and linked together. If the packet does not completely fill the last memory block (413,) the unused bytes in the block are left empty. It should be noted that the particular formatting of the packet, including the specific structure of the packet indicator (420), length indicator (421), next-block pointer (422), and so on, may vary in other embodiments.

Referring to FIG. 4B, the structure of a fragmented packet stored as a linked list 430 is shown. Linked list 430 includes three smaller linked lists, 431-433, each of which is linked to the next (i.e., 431 is linked to 432 and 432 is linked to 433.) Each of linked lists 431-433 is similar in structure to linked list 410. One of the primary differences is that, rather than storing a complete packet, each of lists 431-433 stores a packet fragment rather than a complete packet. Accordingly, the length identified in each of lists 431-433 is the length of the corresponding fragment, rather than the length of a packet. Another of the primary differences is that, in the first block of memory, the first data bit, 441 is a "1," indicating that the memory blocks form a fragmented packet, and the remainder (442) of the first data byte indicates the number of fragments in the packet. (In one embodiment, this indicator can be set to 1, indicating that it is a complete packet, rather than a packet fragment.) Then, the second byte of the block contains a "0" bit (443,) followed by the length (444) of the fragment. The third and subsequent bytes of the data block contain the data of the packet fragment, with next-block pointers and empty bytes as explained above in connection with storage of the unfragmented packet.

It should be noted that, for the purposes of clarity in the following discussion, "packet fragments" or "fragments" will be used to refer to both fragments of packets and complete packets.

Referring to FIG. 4C, the structure of a FIFO (e.g. one of the DMA relaxation FIFOs described above) stored as a linked list is shown. FIFO 450 includes four packets, 451-454. Each of these packets includes a set of sub-parts (e.g., 461-463) that may be packet fragments or data blocks. The packets in FIFO 450 are linked together by setting the next-block pointer at the end of each packet to indicate the beginning of the next packet in the FIFO. The next-block pointer at the end of the last packet is a null pointer, indicating that this is the last packet in the FIFO.

Delayed Acknowledgment

The linked lists implemented by the dynamic memory unit are useful in the implementation of a delayed acknowledgment mechanism because they facilitate the storage of incomplete fragmented packets and/or out-of-order packets or packet fragments along with the necessary re-ordering of packets and reassembly of packet fragments for delivery to the host. This will become more clear with a more detailed explanation of the delayed acknowledgment mechanism.

Delayed acknowledgment refers to the acknowledgment of packets that are transmitted over the wireless communication link. Because packets can be lost in transmission over a wireless link, it is typical for the receiver to acknowledge the packets that are received. It is also necessary for the receiver to deliver the packets to the destination host in the same order that they were presented by the transmitting host to its MAC (so that they can be properly recombined into the original data stream.) The most straightforward way to handle acknowledgment of packets is for the transmitter to send a single packet, wait for acknowledgment of the packet, and then send another packet. If acknowledgment is not received, the first packet is re-sent before transmission of the second packet is attempted.

One problem with this straightforward approach is that time (referred to as guard time) must be allocated between packets for transmission of each packet over the wireless link and return transmission of the corresponding acknowledgment (receiver-to-transmitter turnaround.) This guard time cannot be used to transmit new packets, so it represents a significant loss of bandwidth. Another approach to the acknowledgment and ordering problem is to send several packets with only minimal or no intertransmission spacing and later indicate that the receiver should acknowledge all of the successfully received packets. This effectively amortizes the receiver-to-transmitter turnaround time over a number of transmitted packets. Because some of the earlier packets may not have been successfully received, it may be necessary to store some of the later-received packets rather than delivering them (because the packets must be delivered in order. Thus, while the overhead of the acknowledgments may be reduced, the complexity of delivering the packets in order may be increased.

This situation becomes even more complicated in another acknowledgment/re-ordering scheme which is referred to herein as "delayed acknowledgment." In this scheme, the transmitter transmits multiple packets to the receiver and, at some point, transmits a request for delayed acknowledgment of the received packets. There is no set time for requesting this acknowledgment, however. The receiver is therefore responsible for indefinitely maintaining a list of received packet fragments that can be returned in response to a delayed acknowledgment request, and also maintaining all of the received packet fragments that cannot be delivered because earlier packets have not been successfully received.

The linked list packet storage scheme employed by the dynamic memory unit is useful to provide support for delayed acknowledgment because this scheme facilitates the handling of the packet fragments when they cannot be delivered to the destination device. In conventional systems, these packets typically have to be stored twice—first, when they are stored and awaiting missing packets, and second, when the missing packets are received and the packets need to be recopied into the correct order before being delivered to their destination. Using the linked list scheme, the packet fragments can simply be copied into the packet memory once, and when the missing packet fragments are received, they are simply joined or "stitched" into the chain of packets, which can then be delivered to the destination device.

When packets are received over the wireless link, they need to be written into a DMA relaxation FIFO in the packet memory. Referring again to FIG. 4C, the FIFO is in the form of a linked list (see, e.g., FIFO 450, in which successive packets are linked together.) Each packet fragment within the FIFO may also consist of a linked list of memory blocks (see, e.g., blocks 461-463.) In order to read packets out of FIFO 450, the next packet (e.g., 451) is read out of the FIFO and stored in the destination memory. The corresponding blocks of memory in FIFO 450 can then be deallocated.

Figure 5:
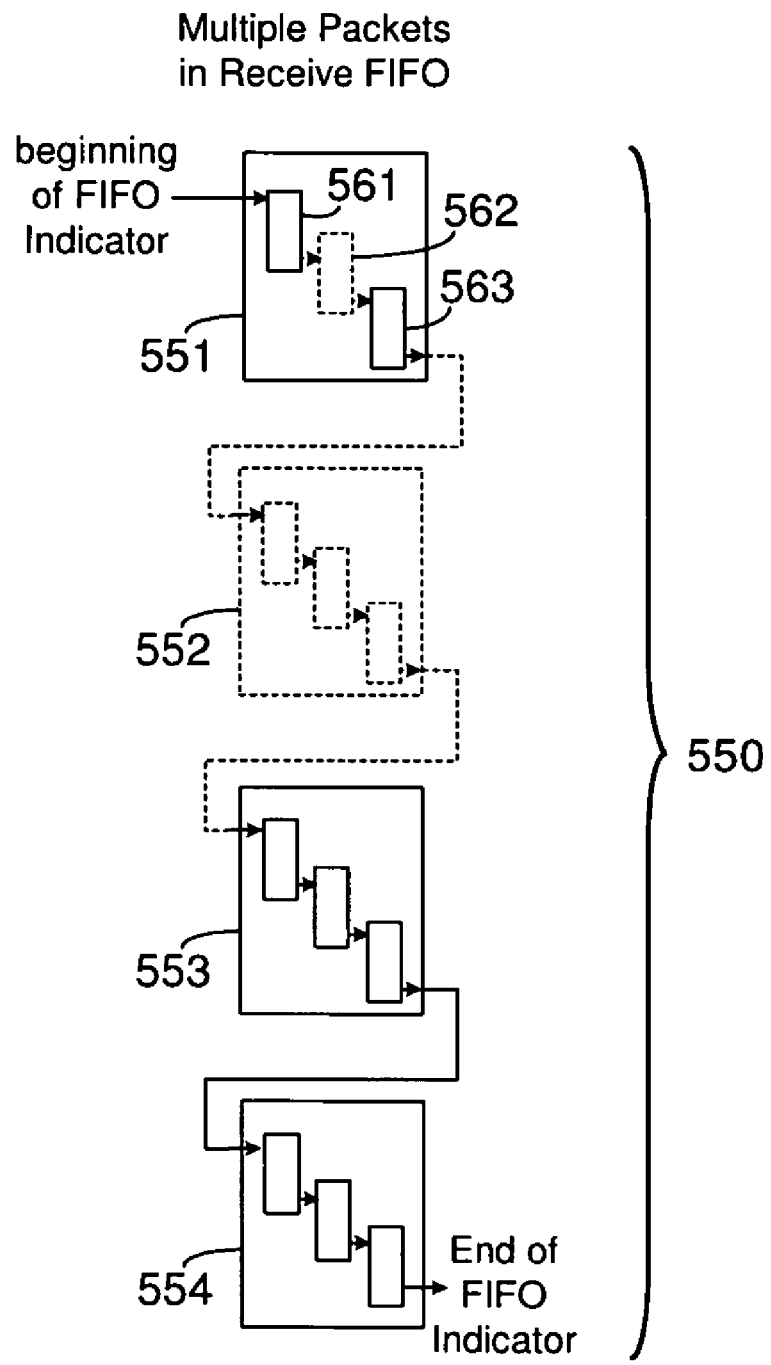
FIG. 5 is a diagram in accordance with one embodiment illustrating the structure of linked lists within a DMA relaxation FIFO in which some packets and packet fragments are missing.

A problem arises, however, when a portion of the data is missing from the FIFO. The missing data may consist of entire packets or packet fragments that were not successfully received. The FIFO data may therefore look more like the diagram shown in FIG. 5. This diagram is essentially identical to the diagram of FIG. 4C, except that some of the data is missing. Specifically, in packet 551, which is the next packet that would be delivered, packet fragments 561 and 563 were successfully received, but intermediate packet fragment 562 was not. Further, no portion of packet 553 (which is intermediate to complete packets 552 and 554) was successfully received. Because, in this example, packet 551 would be the next packet to be delivered to the destination device, none of the packets in the FIFO, including complete packets 552 and 554 can be delivered. The packets must be delivered in order, so the complete packets cannot be delivered until the preceding packets are completed and delivered.

While this is conventionally a very difficult problem to deal with, particularly when the incomplete data may have to be maintained for an indefinite period of time, it is easily dealt with using the linked list structures of the dynamic memory unit. Because the packets transmitted over the wireless link include information identifying the order of the packets, it is a simple matter to determine when one of the packets has not been received. Further, because the packets contain fragment number and length information as discussed above with respect to FIG. 4, and is a relatively straightforward manner to determine whether particular packet fragments are missing. The dynamic memory unit can therefore identifying where breaks occur in the linked list within the FIFO. It is simply a matter of being able to insert the missing packets or packet fragments into the linked list when they are successfully received.

The dynamic memory unit keeps track of the different pieces of the linked list by retaining the portion of the list between breaks as complete chains of data. As packet fragments which fall within the breaks are received, these packets are "stitched" onto the end of the preceding chain if possible. If there remains a missing packet fragment between the newly received packet fragment and the preceding chain, the nearly received packet fragment is viewed as the beginning of the succeeding chain. Whenever a packet or fragment immediately preceding the top of an existing chain is received, the existing chain is stitched on to the newly received packet fragment.

As used herein, "stitching" packet fragments together consists simply of joining the packet fragments by setting the pointer at the end of the preceding packet fragment to point to the beginning of the succeeding packet fragment. The data packet fragments are thereby incorporated into the chain in the same manner as if they had originally been received in the order in which they were transmitted. (Remember that, in either case, the space for the packet fragment is randomly allocated among the memory units, so there is no need to find contiguous memory space for the new data.) Further, because the two parts of the linked list can be connected simply by setting a pointer, there is no need to recopy completed packets to a different memory location sent that they can then be moved (via DMA) to the destination device. The dynamic memory unit thereby saves the cost associated with the recopying of the data.

Figure 6:
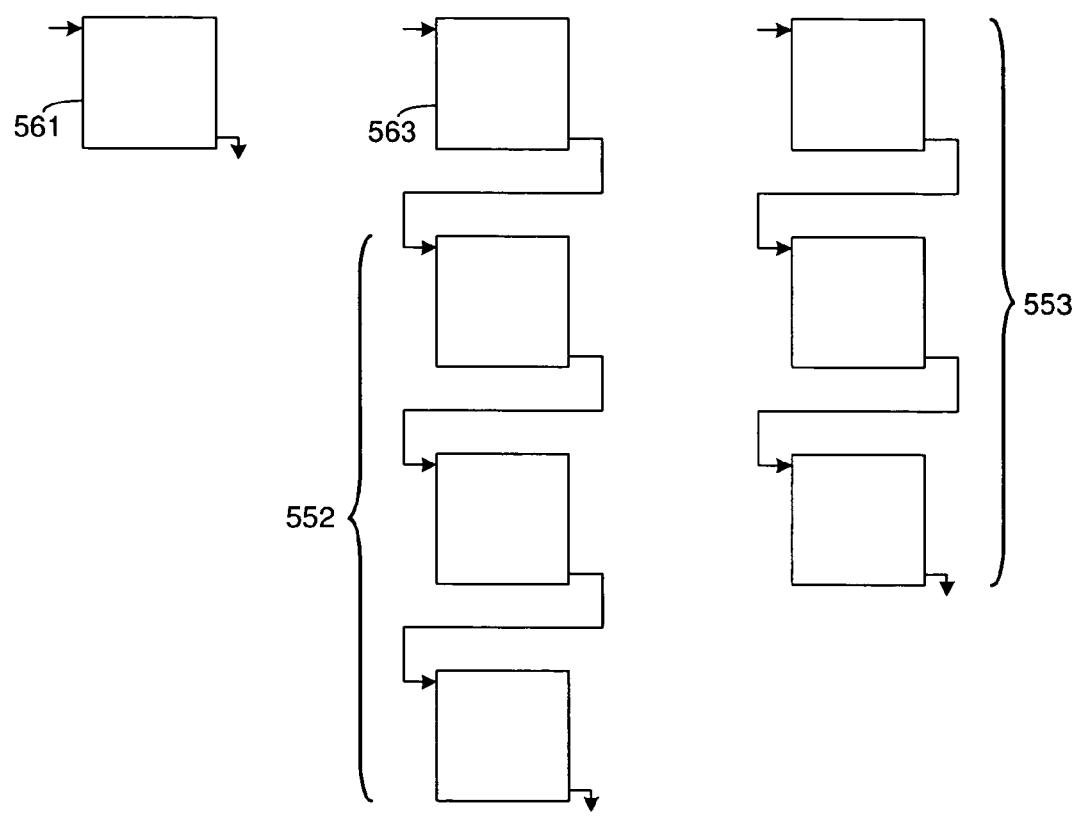
FIG. 6 is a diagram illustrating the linked lists of the FIFO of FIG. 5 as separate chains that can be stitched together in accordance with one embodiment.

The chains (linked lists) formed by the received portions of the linked list of FIFO 550 are represented in FIG. 6. There are three chains—the first includes only packet fragment 561, the second includes packet fragment 563 and packet 552, and the third includes packet 553. When missing packet fragment 562 is received, it will be stored in memory, and the pointer at the end of packet fragment 561 will be set to point to the beginning of packet fragment 562. The first chain will then consist of a linked list having these two packet fragments. Then, because there are no longer any missing packet fragments between fragments 562 and 563, these two fragments can be stitched together by setting the pointer at the end of fragment 562 to point to the beginning of fragment 563. At this point, there will be only two chains—the first including packets 551 and 552, and the second including only packet 554. Because packets 551 and 552 are now complete, and because they are the next packets to be read from the FIFO, FIFO micro engine 230 can be notified that they are ready to be delivered. FIFO micro engine 230 can then read these packets from the linked lists, copy them to the destination memory and deallocate the memory space that had been used to store packets 551 and 552. Later, when packet 553 is received, it can be stitched together with packet 554, and these packets can be delivered as well.

It is clear that this scheme can be extended to much more complex scenarios in which many more chains (having many more breaks between them) are maintained while awaiting receipt of a request for delayed acknowledgment. It should be noted that the task of providing the delayed acknowledgment is itself a much simpler matter. In one embodiment, an acknowledgment frame is maintained by the receiver. As each packet or packet fragment is received, an indication that this particular packet/fragment has been received is recorded in the acknowledgment frame. When the request for delayed acknowledgment is received, the acknowledgment frame has already been prepared, and has simply been awaiting the opportunity to be sent back to the transmitter. After the acknowledgment frame has been transmitted, the receiver begins storing indications of subsequently received packet fragments in a new acknowledgment frame.

While the embodiments described above focus on the implementation of a dynamic memory unit in a MAC engine that interfaces a device to a wireless transceiver, it should be noted that the dynamic memory unit may be useful in other types of systems as well. Embodiments that are implemented in these systems are also contemplated to be within the scope of the invention. Similarly, alternative embodiments may have variations from the above described embodiments in terms of implementation details, such as memory block size, number of memory units, number of access ports, number of DMA engines, and so on. These alternative embodiments are likewise within the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The information and signals may be communicated between components of the disclosed systems using any suitable transport media, including wires, metallic traces, vias, optical fibers, and the like.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software (program instructions) executed by a processor, or in a combination of the two. Software may reside in RAM memory, flash memory, ROM memory, EPROM memory, EEPROM memory, registers, hard disk, a removable disk, a CD-ROM, or any other form of storage medium known in the art. An exemplary storage medium is coupled to a processor such the processor can read information from, and write information to, the storage medium. In the alternative, the storage medium may be integral to the processor. The processor and the storage medium may reside, for example, in an ASIC. The ASIC may reside in a user terminal. The processor and the storage medium may alternatively reside as discrete components in a user terminal or other device.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A system comprising:
   a plurality of memory units;
   a memory management subsystem configured to access the plurality of memory units in parallel and configured to dynamically allocate and deallocate storage space in each of the plurality of the memory units, wherein the memory management subsystem is configured to allocate memory randomly across the memory units and comprises a plurality of ports, the plurality of ports configured to be assessed in parallel and each port comprising:
   an instruction decoder configured to receive instructions and determine if the instruction is an allocate, deallocate or read/write instruction;
   an access state machine configured to implement a read or write access to the plurality of memory units;
   an allocate state machine configured to randomly pre-allocate a plurality of memory blocks across the plurality of memory units and to return a pointer to at least one of the randomly pre-allocated memory blocks memory in response to an allocate instruction; and
   a deallocate state machine configured to deallocate memory in response to a deallocate instruction; and
   a plurality of direct memory access (DMA) engines, each DMA engine associated with a port of the plurality of ports and configured to send instructions to its associated port, wherein the plurality of DMA engines are configured to write to the memory units in parallel utilizing the associated port of the plurality of ports,
   wherein the plurality of ports including at least a first port corresponding to a time division multiple access (TDMA) micro engine and a second port corresponding to a first-in-first-out (FIFO) micro engine,
   wherein,
   during a transmit operation, the FIFO micro engine reads data to be sent and writes the data to a first FIFO in the memory using the second port and the TDMA micro engine reads the data from the first FIFO in the memory using the first port, wherein at least a portion of the writing of data to the first FIFO and the reading of data from the first FIFO takes place in parallel, and
   during a receive operation, the TDMA micro engine reads received data and writes the data to a second FIFO in the memory using the first port and the FIFO micro engine reads the data from the second FIFO in the memory using the second port wherein at least a portion of the writing of data to the second FIFO and the reading of data from the second FIFO takes place in parallel.

2. The system of claim 1, wherein the memory management subsystem is instruction-driven.

3. The system of claim 2, further comprising an instruction bus coupled between the DMA engines and the memory management subsystem to convey memory access instructions from the DMA engines to the memory management subsystem.

4. The system of claim 1, wherein the memory management subsystem is configured to store data in the memory units as linked lists.

5. The system of claim 4, wherein the memory management subsystem is configured to join one or more blocks of data in the memory units in a single linked list by setting a pointer in a first one of the data blocks to point to a beginning of a second one of the data blocks.

6. The system of claim 5, wherein the memory management subsystem is configured to store a plurality of linked lists corresponding to received packet fragments of a data stream, wherein one or more packet fragments intermediate to the received packet fragments have not been received, wherein the memory management subsystem is configured to join the linked lists with the intermediate packet fragments when the intermediate packet fragments are received.

7. The system of claim 6, wherein one of the DMA engines is configured to move from the linked lists to a destination location complete packets for which all preceding packets have been moved to the destination location.

8. The system of claim 1, wherein the memory management subsystem is configured to dynamically allocate space for packet fragments in the memory units when the packet fragments are moved to the memory units.

9. The system of claim 1, wherein the memory management subsystem is configured to dynamically deallocate space in the memory units when data packets stored in the space are removed from corresponding buffers in the memory units.

10. The system of claim 1, further comprising a memory configured to store context information, wherein the context information defines one or more DMA channels through which the DMA engines are configured to move data.

11. The system of claim 10, wherein a DMA relaxation buffer is defined for each of the DMA channels, and wherein data in each of the DMA relaxation buffers is stored in the memory units as one or more linked lists.

12. The system of claim 10, wherein the number of DMA channels is limited only by the available space of the memory units.

13. The system of claim 1, wherein the system is implemented in a medium access control (MAC) engine configured to control data flow between a host device and a transceiver for a wireless communication link.

14. The system of claim 13, wherein the DMA engines include:
  a first DMA engine corresponding to a time division multiple access (TDMA) micro engine within the MAC engine, wherein the first DMA engine is configured to move data between the memory units and a wireless transceiver; and
  a second DMA engine corresponding to a first-in-first-out (FIFO) micro engine within the MAC engine, wherein the second DMA engine is configured to move data between the memory units and a destination location.

15. The system of claim 1, further comprising a microprocessor, wherein the microprocessor is associated with a port of the plurality of ports and configured to send instructions to its associated port.

16. A method comprising:
  providing a plurality of memory units, wherein the memory units are configured to access in parallel;
  dynamically allocating and deallocating storage space in each of the plurality of the memory units to store data in the memory units wherein the storage space is allocated randomly across the memory units; and
  accessing two or more of the memory units in parallel using a memory management subsystem, wherein the memory management subsystem is configured to receive instructions and to implements the instructions from the plurality of direct memory access (DMA) engines in parallel, and
  writing data from two or more DMA engines of the plurality of DMA engines to two or more memory units of the plurality of the memory units in parallel using the plurality of ports of the memory management subsystem,
  wherein each DMA engine associated with a port, each port configured to receive instructions and to determine if the instruction is an allocate, deallocate or read/write instruction, to implement a read or write access to the plurality of memory units, randomly to pre-allocate a plurality of memory blocks across the plurality of memory units and to return a pointer to at least one of the randomly pre-allocated memory blocks memory in response to an allocate instruction, and to deallocate memory in response to a deallocate instruction,
  wherein the plurality of ports including at least a first port corresponding to a time division multiple access (TDMA) micro engine and a second port corresponding to a first-in-first-out (FIFO) micro engine,
  wherein,
  during a transmit operation, the FIFO micro engine reads data to be sent and writes the data to a first FIFO in the memory using the second port and the TDMA micro engine reads data from the first FIFO in the memory using the first port, at least a portion of the writing of data to the first FIFO and the reading of data from the first FIFO takes place in parallel, and
  during a receive operation, the TDMA micro engine reads received data and writes the data to a second FIFO in the memory using the first port and the FIFO micro engine reads data from the second FIFO in the memory using the second port wherein at least a portion of the writing of data to the second FIFO and the reading of data from the second FIFO takes place in parallel.

17. The method of claim 16, wherein accessing the memory units comprises the DMA engines transmitting memory access instructions to the memory management subsystem.

18. The method of claim 17, wherein the DMA engines transmit memory access instructions to the memory management subsystem via an instruction bus coupled between the DMA engines and the memory management subsystem.

19. The method of claim 16, further comprising storing data in the memory units as linked lists.

20. The method of claim 19, further comprising joining one or more blocks of data in the memory units in a single linked list by setting a pointer in a first one of the data blocks to point to a beginning of a second one of the data blocks.

21. The method of claim 20, further comprising storing a plurality of linked lists corresponding to received packet fragments of a data stream, wherein one or more packet fragments intermediate to the received packet fragments have not been received, and joining the linked lists with the intermediate packet fragments when the intermediate packet fragments are received.

22. The method of claim 21, further comprising moving compete packets, for which all preceding packets have been moved to a destination location, from the linked lists to the destination location using one of the DMA engines.

23. The method of claim 16, further comprising dynamically allocating space for packet fragments in the memory units when the packet fragments are moved to the memory units.

24. The method of claim 16, further comprising dynamically deallocating space in the memory units when data packets stored in the space are removed from corresponding buffers in the memory units.

25. The method of claim 16, further comprising storing context information in a memory, wherein the context information defines one or more DMA channels through which the DMA engines are configured to move data.

26. The method of claim 25, further comprising defining a DMA relaxation buffer for each of the DMA channels, and storing data for each of the DMA relaxation buffers in the memory units as one or more linked lists.

27. The method of claim 25, wherein the number of DMA channels is limited only by the available space of the memory units.

28. The method of claim 16, further comprising performing the method in a MAC engine which is configured to control data flow between a host device and a transceiver for a wireless communication link.

29. The method of claim 28, further comprising:
  moving data between the memory units and a wireless transceiver using a first DMA engine corresponding to a time division multiple access (TDMA) micro engine within the MAC engine; and
  moving data between the memory units and a destination location using a second DMA engine corresponding to a first-in-first-out (FIFO) micro engine within the MAC engine.

30. The method of claim 16, wherein the memory management subsystem implements instructions from a microprocessor.

31. A transceiving device, comprising:
  a memory comprising a plurality of memory units;
  a medium access control (MAC) engine configured to access the plurality of memory units in parallel and configured to dynamically allocate and deallocate storage space in each of the plurality of the memory units, wherein the MAC engine is configured to allocate memory randomly across the memory units, the MAC engine comprising a time division multiple access (TDMA) micro engine having a first DMA engine;

a first-in-first-out (FIFO) micro engine having a second DMA engine;

a memory management (MMU) micro engine, comprising a plurality of ports, including a first port corresponding to the TDMA micro engine and a second port corresponding to the FIFO micro engine, where each of the first port and the second port are configured to be accessed in parallel, each port comprising:

an instruction decoder configured to receive instructions and determine if the instruction is an allocate, deallocate or read/write instruction;

an access state machine configured to implement a read or write access to the plurality of memory units;

an allocate state machine configured to randomly pre-allocate a plurality of memory blocks across the plurality of memory units and return a pointer to at least one of the randomly pre-allocated memory blocks memory in response to an allocate instruction; and a deallocate state machine configured to deallocate memory in response to a deallocate instruction, wherein, during a transmit operation, the FIFO micro engine reads data to be sent and writes the data to a first FIFO in the memory using the second port and the TDMA micro engine reads data from the first FIFO in the memory using the first port, wherein at least a portion of the writing of data to the first FIFO and the reading of data from the first FIFO takes place in parallel, and during a receive operation, the TDMA micro engine reads received data and writes the data to a second FIFO in the memory using the first port and the FIFO micro engine reads data from the second FIFO in the memory using the second port wherein at least a portion of the writing of data to the second FIFO and the reading of data from the second FIFO takes place in parallel.

\* \* \* \* \*